United States Patent
Arnaud et al.

(10) Patent No.: US 9,459,149 B2
(45) Date of Patent: Oct. 4, 2016

(54) EVANESCENT WAVE MICROSPECTROMETER

(71) Applicant: Universite de Technologie de Troyes, Troyes (FR)

(72) Inventors: Laurent Arnaud, Marseille (FR); Yassine Hadjar, Paris (FR); Mikael Renault, Lognes (FR); Aurelien Bruyant, Troyes (FR); Sylvain Blaize, Troyes (FR)

(73) Assignee: UNIVERSITE DE TECHNOLOGIE DE TROYES, Troyes (FR)

( * ) Notice: Subject to any disclaimer, the term of this patent is extended or adjusted under 35 U.S.C. 154(b) by 0 days.

(21) Appl. No.: 15/023,914

(22) PCT Filed: Sep. 26, 2014

(86) PCT No.: PCT/FR2014/052438
§ 371 (c)(1),
(2) Date: Mar. 22, 2016

(87) PCT Pub. No.: WO2015/044611
PCT Pub. Date: Apr. 2, 2015

(65) Prior Publication Data
US 2016/0245699 A1     Aug. 25, 2016

(30) Foreign Application Priority Data
Sep. 27, 2013   (FR) ..................... 13 59335

(51) Int. Cl.
*G01J 3/28*     (2006.01)
*G01J 3/45*     (2006.01)
(52) U.S. Cl.
CPC ............ *G01J 3/45* (2013.01); *G01J 2003/283* (2013.01)

(58) Field of Classification Search
CPC ................ G01J 3/45; G01J 3/02; G01J 3/28; G01J 3/10; G01J 3/2803; G01J 3/2823
See application file for complete search history.

(56) References Cited

U.S. PATENT DOCUMENTS

2010/0259254 A1 * 10/2010 Verschuren ............ G01N 15/06
                                                        324/244
2015/0116720 A1     4/2015 Hadjar

FOREIGN PATENT DOCUMENTS

FR            2 929 402       10/2009
WO    WO 2007/072428           6/2007

OTHER PUBLICATIONS

International Search Report dated Feb. 18, 2015 out of corresponding priority Application No. PCT/FR2014/052438 (5 pages).
Written Opinion dated Feb. 18, 2015 out of corresponding priority Application No. PCT/FR2014/052438 (7 pages).

\* cited by examiner

*Primary Examiner* — Abdullahi Nur
(74) *Attorney, Agent, or Firm* — Brinks Gilson & Lione; G. Peter Nichols

(57) ABSTRACT

An evanescent wave microspectrometer includes a planar diopter separating two transparent media, an optical sensor with a pixel array, and disposed in the second transparent medium, and an interference device disposed such that at least a part of the interference device is in contact with evanescent waves generated at the surface of the diopter. The micro-spectrometer also includes a memory storing a map having a set of set of data grids including the optical response of said sensor for a set of quasi-monochromatic wavelengths of a calibration light source, and a calculator configured to determine the spectrum (ψ) of a test light source configured to generate evanescent waves at the surface of the diopter, on the basis of the map and the optical response of the sensor.

10 Claims, 1 Drawing Sheet

EVANESCENT WAVE MICROSPECTROMETER

Figure 1:
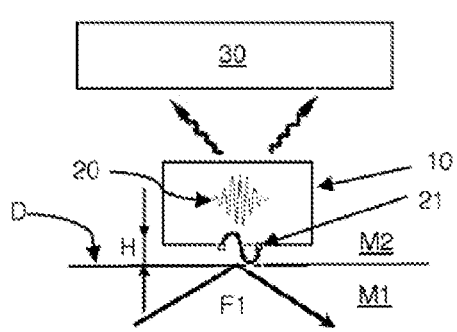

This application claims priority to International Application No. PCT/FR2014/052438 filed Sep. 26, 2014 and to French Application No. 1359335 filed Sep. 27, 2013; the entire contents of each are incorporated herein by reference.

The present invention relates to the field of spectrometry.

More precisely, the invention relates to an evanescent wave micro-spectrometer comprising:

- a plane diopter (D) separating a first transparent medium (M1) and a second transparent medium (M2) having respectively a first and a second index of refraction, the index of refraction of the first medium (M1) being higher than the one of the second medium (M2),
- a CCD or CMOS optical sensor (30) comprising an array of pixels sensitive to the light intensity and disposed in the second transparent medium (M2), and
- an interference device ((10, F1); (11, F1_1, F1_2)) disposed at a distance (H) from the plane diopter (D), the distance (H) being chosen so that, when evanescent waves are generated at the surface of said diopter (D) in the second transparent medium (M2), at least a part of said interference device is in contact with said evanescent waves.

Such a spectrometer is known to those skilled in the art, notably through the example given by the document of the prior art FR2929402 filed by the applicant.

However, in such a spectrometer, although effective, it is necessary for the interference and scattering device to comprise nanostructures, and for the latter to be aligned in a very particular manner with respect to the interference fringes and to the pixels of the sensor. In particular, the 2D array of nanostructures must be perfectly periodic; the precision of the positioning within the array of each nanostructure is critical because the extraction of the spectrum is achieved by a Fourier transformation (with nanometric precision).

Furthermore, in this document, the nanostructures must be identical to one another, and the array of nanostructures must have very large dimensions (>mm 2) in order to obtain a high spectral resolution of the spectrometer; in other words, fairly complex nano-structuring techniques (large-scale electron beam lithography, nanoimprint, etc.) must be used in order to obtain an array with millimeter or even centimeter dimensions with a nanometer precision on the positioning of the nanostructures.

The aim of the present invention is to overcome these drawbacks by providing a simple but ingenious solution that allows both the constraints in the positioning of each microstructure/nanostructure within the array and in the dimensions of the array of microstructures/nanostructures to be obviated.

With this objective in mind, the device according to the invention, furthermore conforming to the aforementioned introduction, is noteworthy in that it furthermore comprises:

- a memory storing a mapping (40) comprising a set of data grids (41, 42, 43), and
- a calculator (50), electrically connected to the memory and to the sensor (30), in which each data grid of the mapping (40) comprises the optical response of said sensor (30) for a given virtually-monochromatic wavelength of a calibration light source, configured for generating said evanescent waves at the surface of said diopter (D) in the second transparent medium (M2), and the calculator (50) is configured for determining the spectrum (w) of a test light source, as a function of said mapping (40) and of the optical response of said sensor (30) to said test light source, said test light source being polychromatic or virtually-monochromatic, and configured for generating said evanescent waves at the surface of said diopter (D) in the second transparent medium (M2).

In one embodiment, the micro-spectrometer furthermore comprises said test light source and an optical device configured for generating an incident beam (F1) in the first transparent medium (M1) from said test light source.

In one embodiment, the interference device comprises a set of microstructures (10).

Preferably, the angle of incidence of the incident beam (F1) with the surface of the diopter (D) is greater than the refraction limit angle of incidence, so as to obtain a total internal reflection.

In one embodiment, the interference device comprises a set of nanostructures (11).

Preferably, a beam divider disposed is furthermore provided in the first medium (M1) configured for dividing said incident beam (F1) into a first sub-beam (F1_1) and a second sub-beam (F1_2) so that they interfere at the surface of the diopter (D) and in which the angle of incidence of the first sub-beam (F1_1) and of the second incident sub-beam (F1_2) with the surface of the diopter (D) is greater than the refraction limit angle of incidence.

In one embodiment, a spatial filtering device disposed in the first medium (M1) is furthermore provided.

In one embodiment, a memory coupled to the calculator is furthermore provided comprising instructions executable by the latter for:

- storing the distribution of the signal over the pixels of the sensor ([P]);
- solving the system of equations $[P]=R[\psi]$ knowing the optical response of the sensor [R] and [P] for the whole set of the wavelengths of the mapping;
- calculating the whole set of the wavelengths ($[L1, \ldots Li, \ldots Ln]$) of the spectrum ($[\psi]$).

It may be provided for the calculator to comprise instructions for solving the system of equation $[P]=R[\psi]$ by a least squares method.

In one embodiment, each data grid (41, 42, 43) of the mapping (40) is a response of the sensor (30) in gray levels at a given virtually-monochromatic wavelength, the intensity of each incident virtually-monochromatic wavelength of the assembly being known.

The first transparent medium (M1) may be a prism or a thin plate in which the incident beam (F1) or the incident sub-beams (F1_1, F1_2) are preferably guided by total internal reflection (the index of refraction of the medium (M1) always being greater than the one of the medium (M2)).

Thanks to the invention, it is possible to transform a conventional CCD or CMOS sensor into a spectrometer, such as described hereinafter with CCD and CMOS, the acronyms for Charge-Coupled Device and Complementary Metal Oxide Semiconductor, respectively.

Thanks to the invention, the surface area of microstructures or of nanostructures required may be as low as 200 µm*200 µm.

Figure 2:
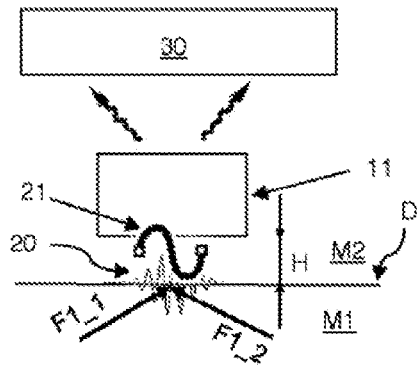
Figure 3:
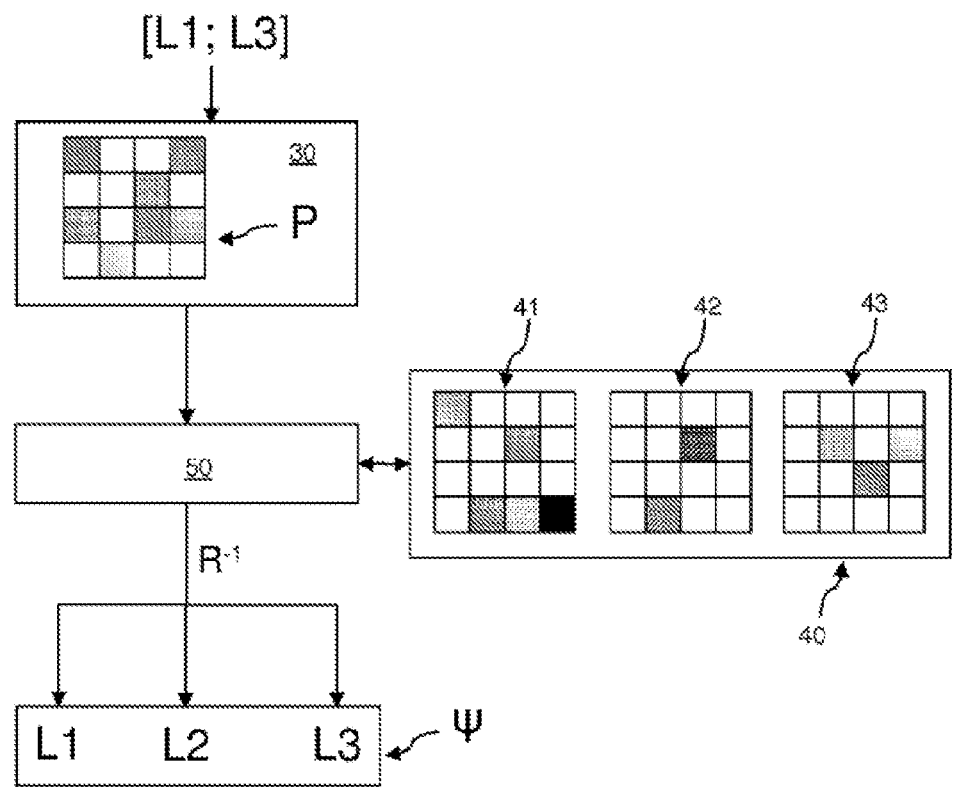

Other features and advantages of the present invention will become more clearly apparent upon reading the following description presented by way of illustrative and non-limiting example and with reference to the appended figures in which:

FIG. 1 illustrates one embodiment of the micro-spectrometer with microstructures according to the invention, FIG. 2 illustrates an embodiment of the micro-spectrometer with nanostructures according to the invention, and FIG. 3 illustrates the operation of the micro-spectrometer according to the invention.

Several embodiments of an evanescent wave micro-spectrometer are envisioned here.

Generally speaking, an evanescent wave spectrometer comprises a diopter D separating a first medium M1, typically transparent, for example glass, and a second medium M2, typically transparent, for example air (the index of refraction of the medium M1 always being greater than that of the medium M2).

The diopter may be a conventional diopter, for example a prism or a thin plate in which the incident beam is guided by total internal reflection.

The first transparent medium has a first index of refraction. The second transparent medium has a second index of refraction. Typically, the first index of refraction is greater than the second index of refraction.

A test light source is provided whose spectrum to be determined is included between a minimum wavelength L1 and a maximum wavelength Ln. The values L1 and Ln may be unknown. They may also depend on the characteristics of the optical sensor described hereinafter.

An optical device, not shown, allows an incident beam F1 to be generated from the test light source. The incident beam F1 is disposed on the side of the first transparent medium M1, and the angle of incidence of the incident beam with the surface of the diopter is preferably greater than the refraction limit angle of incidence, so as to obtain a total internal reflection, which limits undesirable optical effects. Alternatively, dark field operation may be adopted.

The micro-spectrometer comprises an optical sensor 30, typically a CCD or CMOS sensor, comprising an array of pixels sensitive to the light intensity. The sensor is generally disposed on the side of the second transparent medium M2. At its simplest, the sensor generates a response to the light intensity received by its pixels in gray levels.

The distance separating the surface of the diopter from the surface of the array of pixels of the sensor may be of the order of magnitude of a micrometer.

The micro-spectrometer also comprises an interference device for said first incident beam, the light intensity of said interference effects being received by the pixels of said sensor.

In one embodiment, see FIG. 2, the interference device for said incident beam comprises a set of nanostructures 11, formed for example by three-dimensional nanolithography.

The nanostructures 11 are preferably dispersed over a plane parallel to the surface of the diopter, itself parallel to the surface of the sensor.

They are deposed in the second medium M2, within the space separating the surface of the diopter D from the surface of the sensor:
- on the surface of the diopter itself;
- on the surface of the sensor itself, or
- on an intermediate surface or substrate, for example made of glass.

The distribution of the nanostructures may be random, virtually-random or ordered. It is not essential to establish a one-to-one correspondence between a nanostructure and a pixel of the sensor.

Different types of nanostructures may be provided, for example made of gold, of TiO2 or another photonic crystal. Metals and dielectrics (insulating, transparent) may for example be provided. Metals have the advantage of a greater scattering, but they generate losses by absorption of a part of the light. These losses are low in the case where the diopter is a prism (in which the losses are above all due to the reflection of the incident beam). The losses may be more significant in the case where the diopter is a thin plate in which the incident beam is guided by total internal reflection. In this case, nanostructures comprising a dielectric such as for example TiO2 are advantageous.

The nature of the nanostructures 11 may be heterogeneous: different types of nanostructures may be mixed.

The nanostructures are structures for example made of metal, polymer, ceramic or composite material, whose external dimensions are contained within a parallelepiped of nanometric dimensions, for example with a length in the range between 50 and a few hundred nanometers (in the present case up to 800 nm), with a width in the range between 50 and 100 nanometers and with a height in the range between 50 and a few hundred nanometers (in the present case a height equal to the length of penetration of the evanescent wave, here 300 nm). The size of a nanostructure is smaller than the minimum wavelength of an incident spectrum.

The form of the nanostructures can be any given shape. Preferably, simple and easy to fabricate shapes are provided such as rod shapes, dots, plots, cylinders or polyhedrons. For example, for a visible incident spectrum (400-800 nm), nanostructures with a substantially parallelepipedic shape can be provided.

Preferably, nanostructures are provided that are smaller than the inter-fringe separation of the interferogram 20, so as to conserve a good contrast, the inter-fringe separation always being smaller than the incident wavelength.

In a known manner, the incident beam F1 can be divided into two sub-beams: a first sub-beam F1_1 and a second sub-beam F1_2 interfere at the surface of the diopter D.

The angle of incidence of the first sub-beam F1_1 and of the second incident sub-beam F1_2 with the surface of the diopter D is preferably greater than the refraction limit angle of incidence, so as to also obtain a total internal reflection, as previously described.

In total internal reflection mode, an evanescent wave 21 is formed at the surface of the diopter D on the side of low index, here the second transparent medium M2, and neither sub-beam F1_2 or F1_2 propagates beyond the diopter; in the present case, neither sub-beam F1_2 or F1_2 propagates into the second transparent medium M2.

Since the first incident sub-beam F1_1 and the second incident sub-beam F1_2 are configured for interfering at the surface of the diopter, the resultant evanescent wave is representative of the interference between these two incident sub-beams. The distribution of intensity within the evanescent wave reflects exactly that of the interferogram produced by the total internal reflection of the first and second incident sub-beams.

Irrespective of the position of the nanostructures 11, it is provided for at least some of them to be in contact with the evanescent waves. For this purpose, the nanostructures are positioned at a distance H from the diopter D, such that H is less than or equal to the amplitude, or the depth of penetration, of the evanescent waves 21 generated by the first incident sub-beam F1_1 and the second incident sub-beam F1_2.

Thus, the nanostructures have an effect of scattering the evanescent waves toward the pixels on the surface of the sensor 30.

By way of an alternative to the scattering function of the nanostructures, any known means of scattering may be provided, for example a diffuser film, although such films have a tendency to reduce the light intensity at the pixels of the sensor.

Furthermore, it is also possible to envision an embodiment with nanostructures in which only one incident beam F1 is implemented. The angle of incidence of the beam F1 with the surface of the diopter D is preferably greater than the refraction limit angle of incidence, so as to also obtain a total internal reflection and generate evanescent waves. In this case, the micro-spectrometer is simple to implement but its resolution is somewhat poorer. Indeed, the presence of an interferometric effect allows the dynamic range of the scattering spectrum to be amplified: a small variation in incident wavelength generates a large effect on the scattered intensity. In this embodiment, as no interferometric effect is generated owing to the presence of a single beam, the dynamic range of the scattering spectrum is thus reduced but it nevertheless remains possible to reconstruct spectra. For this purpose, significant non-uniformities are preferably provided with regard to the size and to the shapes of the nanostructures.

In another embodiment, see FIG. 1, the interference device for said incident beam F1 comprises a set of microstructures 10. In this case, only the incident beam F1 is needed. It may also be used with the two sub-beams described previously. The advantage of the embodiment with a single beam is its simplicity of implementation.

The microstructures 10 are preferably dispersed over a plane parallel to the surface of the diopter, itself parallel to the surface of the sensor.

They are deposed within the space separating the surface of the diopter from the surface of the sensor. They may be deposed on the surface of the diopter itself or on the surface of the sensor itself, or else on an intermediate surface.

The distribution of the microstructures 10 may be random, virtually-random or ordered. It is not essential to establish a one-to-one correspondence between a microstructure and a pixel of the sensor.

Different types of microstructures may be provided, for example a metal such as gold, a dielectric such as TiO2, a polymer, ceramic, composite material or a photonic crystal. The nature of the microstructures may be non-homogeneous, where various types of microstructures can be mixed. The form of the microstructures may be of any given shape. Preferably, shapes that are simple and easy to fabricate are provided such as rod shapes, dots, beads, cylinders or polyhedra. The microstructures may also take the form of microcavities.

The microstructures are structures whose external dimensions can fit into a parallelepiped of micrometric dimensions. Preferably, the length of the parallelepiped is greater than the value Ln of the maximum wavelength of the spectrum to be determined. The size of a microstructure is greater than the maximum wavelength of an incident spectrum.

For example, microstructures with a substantially parallelepipedic shape may be provided with a length in the range between 1 and 10 micrometers, with a width of 1 micrometer and with a height in the range between 50 and 100 nanometers.

Preferably, the angle of incidence of the incident beam F1 with the surface of the diopter is greater than the refraction limit angle of incidence, so as to obtain a total internal reflection.

As previously seen, in total internal reflection mode, an evanescent wave is formed at the surface of the diopter on the low index side, here the second transparent medium M2. The first beam F1 does not propagate into the second transparent medium M2.

Irrespective of the position of the microstructures 10, it is provided for at least some of them to be in contact with the evanescent waves. Just as for the nanostructures, the microstructures are positioned at a distance H from the diopter D, such that H is less than or equal to the amplitude, or the depth of penetration, of the evanescent waves 21 generated by the incident beam F1.

By virtue of this contact and of the fact that at least one of the dimensions of each microstructure is greater than the maximum wavelength of the incident spectrum, the evanescent waves are reflected in the microstructures and can interfere there then be scattered toward the pixels on the surface of the sensor 30, the spectral response being dependent on the shape and the size of the microstructures. In the case of a single first beam F1, reference is made to localized interference effects 20 in the microstructures instead of the interferogram.

Irrespective of the embodiment (using microstructures or nanostructures), the pixels of the sensor receive a light intensity corresponding to an interferogram 20, the interferences taking place either within the microstructures 10 or at the diopter and scattered by the nanostructures 11.

Irrespective of the embodiment, the total internal reflection allows the contrast to be enhanced because the pixels of the sensor 30 are only sensitive to the photons which have interacted with the microstructures 10, respectively the nanostructures 11.

Irrespective of the embodiment, it is preferably chosen to determine the dimensions of the microstructures or the nanostructures as a function of the values of the end limits L1, Ln of the spectrum.

Irrespective of the embodiment, for a given wavelength, the intensity scattered by the microstructures or the nanostructures depends notably on the shape of each of them and on their position. Thus, preferably, the microstructures or the nanostructures are heterogeneous in their shape and distributed in a random manner. Thanks to these characteristics, the scattering profile, in other words the intensity scattered by the microstructures or the nanostructures, for a given wavelength is different from the scattering profile of said microstructures or of said nanostructures for another wavelength, which improves the quality of response of the spectrometer.

In one embodiment, it is provided for the microstructures or the nanostructures to have a substantially parallelepipedic shape and to be aligned in the plane of incidence.

The microstructures or the nanostructures may each have a specific individual shape. Independently of the shape of the base of the microstructures/nanostructures, it may also be provided for the height of the latter to be the same. Advantageously, the height, in other words the thickness, of the microstructures/nanostructures is non-uniform, which will increase the spectral response of the latter, in other words the resolution of the micro-spectrometer.

The nanostructures or the microstructures may respectively be nanoparticles and microparticles.

A standard CCD or CMOS optical sensor 30 is only sensitive to the light intensity, in other words to the number of photons hitting the surface of its pixels per unit time, and not to the wavelength of the latter.

The surface functionalization, implemented by the microstructures or the nanostructures, allows a standard CCD or CMOS optical sensor to be usable as a spectrometer, in other words to be sensitive to the incident wavelengths.

Calibration

For this purpose, an initial step is provided for calibration of the micro-spectrometer by a set of incident virtually-monochromatic wavelengths. Preferably, the spectrum to be determined [L1, Ln] is included within the set of calibration incident virtually-monochromatic wavelengths. Preferably, it is provided for the intensity of each incident virtually-monochromatic wavelength of the set to be known, or even constant.

For the calibration, the set of incident virtually-monochromatic wavelengths may be obtained by a test light source such as a virtually-monochromatic tunable laser or by a super-continuum white light source filtered by an adjustable multi-band acousto-optical filter. For example, the adjustable region is from 450 nm to 700 nm.

The calibration then consists in recording the response of the optical sensor 30 to a plurality, and preferably to each, of the wavelengths from the set of the incident virtually-monochromatic wavelengths, in this case to a series of pulses each centered on a wavelength in the range between 450 nm and 700 nm and varying according to a predetermined step, preferably in the range between 1 nm and 10 nm, and in the present case 1 nm.

For each incident virtually-monochromatic wavelength of the set, the response of the optical sensor is recorded in a memory in the form of a data grid, in this case in gray levels. All of the responses of the sensor to the set of the incident virtually-monochromatic wavelengths constitutes the mapping.

The response of the optical sensor to a given wavelength is a mapping, for example in gray levels, whose intensity per pixel depends on the number of photons received per pixel per unit time.

Each mapping comprises the response of the pixels of the sensor 30 to the incident virtually-monochromatic wavelength, here in gray levels, during the calibration step.

There is a one-to-one correspondence between an incident virtually-monochromatic wavelength and its corresponding mapping.

For the implementation of the micro-spectrometer, after the calibration step, a later step is provided for signal processing by a computer 50. The signal processing step consists in processing the optical response of the sensor 30 to the incident spectrum ψ ([L1; Ln]) in order to determine the corresponding data grids in the mapping 40, and to deduce from these the wavelengths of the spectrum.

It is thus possible to process the incident spectrum and to transform a distribution of light intensity in the space of the pixels into a distribution of intensity in the space of the wavelengths, by a function f described hereinafter.

This processing may be implemented by computer, by virtue of an associated computer program.

Let the incident spectrum ψ (L) be any give spectrum over a spectral domain in the range between L1 and Ln.

A discretization step ΔL is defined, which could be variable over the spectral domain in question.

In order to sample the incident spectrum ψ (L), the latter may be decomposed according to the discretization step ΔL, on the basis of binary functions δi (L), such as for example $\delta i(L) = 1$ for $L = Li \pm L/2$ and $\delta i(L) = 0$ otherwise In this example, this then gives $$\psi(L) = \sum_{i=1}^{N} ai \delta i(L)$$

with ai a parameter.

In the space of the binary functions δi (L), the incident spectrum ψ(L) may be written in the following vector form:

$$[\Psi] = \begin{pmatrix} a1 \\ \dots \\ ai \\ \dots \\ aN \end{pmatrix}$$

At the sensor, the assembly of the pixels receives an optical signal corresponding to the scattered interferences. The signal distribution over the whole set of the pixels may be written in the form of a vector P, whose components Pi are the intensities of each pixel i, for a total of N pixels; i.e.

$$[P] = \begin{pmatrix} P1 \\ \dots \\ Pi \\ \dots \\ PNpixels \end{pmatrix}$$

Owing to the surface functionalization by the microstructures or the nanostructures, there exists a transformation function f which links the signal distribution over the pixels, in other words the vector [P], to the incident spectrum, in other words the vector [ψ].

We therefore have [P]=f([ψ]).

Now, f is necessarily a function going through the origin (no incident beam implies no response from the sensor). In the present case, f is a linear transformation going through the origin.

The relationship between the vector [P] and the vector [ψ] may therefore be written $[P] = R[\psi]$     (1)

in which R is a matrix corresponding to the optical response of the sensor.

However, the matrix R is known from the calibration step. The distribution of the signal over the pixels of the sensor gives the coordinates of the vector [P].

The idea is therefore to solve the system of equations [P]=R[ψ] by the calculator 50.

There are several methods that may be envisioned for this purpose. In the example presented here, it is a well known least-squares method that is used. This type of method is adapted to over-determined systems of equations. Additional unknowns referred to as "residues" are introduced.

The best one of the elements [ψ] is then sought, in other words that which minimizes these residues. Therefore:

[residues]=R[ψ]-[P]

and a [ψ] is sought that minimizes Sum ([residues]$^2$): this is a least-squares method or "lsq", which may be implemented by calculator (for example by the function 'lsqnoneg' under the matlab(registered trademark) calculation software application). It may be imposed for the elements [ψ] to be positive; this condition may effectively be included so as to be sure of having a physical solution, the spectrum [ψ] being necessarily non-negative.

Refinements to these types of methods exist. Other least-squares methods may work, and solution methods of other than a least-squares method may also be envisioned.

In the absence of noise, the resolution of the micro-spectrometer is directly linked to the number of pixels in the sensor. In the case of a sampling with a constant discretization step ΔL, the resolution is equal to the spectral interval Ln-L1 divided by the number of pixels, which is more advantageous the greater the number of pixels.

In the presence of noise, it is preferably provided for the variation in intensity for each pixel to be peaked, in other words with large variations of intensity in the spectrum sensed by a pixel, which may be obtained by photonic crystals such as micro/nanostructures. Preferably, the nanostructures are metamaterials, in other words materials appearing to be homogeneous for the incident electromagnetic field (the beam). With the current techniques for fabricating nanostructures, it is possible to control the thickness of the latter, and the effective index, which allows an improved control over the spectral response per pixel and to achieve more abrupt variations.

Preferably, it is provided for each pixel to have a respective individual spectral response, in other words the spectrum incident on a given pixel is different from the spectrum incident on another pixel.

Preferably, the micro-spectrometer comprises a spatial filtering device for the incident beam in the embodiment with microstructures, and a spatial filtering device for the first and for the second incident sub-beams in the embodiment with nanostructures.

One purely illustrative example of operation of the micro-spectrometer according to the invention is given in FIG. 3.

In this simplified example, an incident spectrum [L1; Ln] with n=3, in other words an unknown incident spectrum [L1;L3] combining three wavelengths L1, L2 and L3, is sensed by the pixels of an optical sensor 30 after interference and scattering by microstructures 10 or nanostructures 11.

The response P of the optical sensor 30 is an array of pixels here in gray levels.

During the calibration, a plurality of data grids is established by the spectrometer.

To simplify here:
the data grid 41 corresponds to the response of the sensor 30 to the virtually-monochromatic wavelength L1 during the calibration step;
the data grid 42 corresponds to the response of the sensor 30 to the virtually-monochromatic wavelength L2 during the calibration step; and
the data grid 43 corresponds to the response of the sensor 30 to the virtually-monochromatic wavelength L3 during the calibration step.

The calculator 50 can therefore calculate the inverse matrix $R^{-1}$ by reference to the mapping 40 and the data grids 41, 42, 43, and deduce from this the wavelengths L1, L2 and L3 of the spectrum ψ.

The invention claimed is:

1. An evanescent wave micro-spectrometer comprising:
a plane diopter separating a first transparent medium and a second transparent medium having respectively a first and a second index of refraction, the index of refraction of the first medium being greater than the index of the second medium;
an optical CCD or CMOS sensor comprising an array of pixels sensitive to the light intensity and disposed in the second transparent medium;
an interference device disposed at a distance from the plane diopter, the distance being chosen so that, when evanescent waves are generated at the surface of the diopter in the second transparent medium, at least a part of the interference device is in contact with the evanescent waves;
a memory storing a mapping comprising a set of data grids, and
a calculator, electrically connected to the memory and to the sensor, in which
each data grid of the mapping comprises the optical response of the sensor for a given virtually-monochromatic wavelength of a calibration light source, configured for generating said evanescent waves at the surface of the diopter in the second transparent medium, and
the calculator configured to determine the spectrum (ψ) of a test light source as a function of the mapping and of the optical response of the sensor to the test light source, the test light source being polychromatic or virtually-monochromatic, and configured to generate the evanescent waves at the surface of the diopter in the second transparent medium.

2. The micro-spectrometer as claimed in claim 1 further comprising the test light source and an optical device configured to generate an incident beam in the first transparent medium from the test light source.

3. The micro-spectrometer as claimed in claim 1, wherein the interference device comprises a set of microstructures.

4. The micro-spectrometer as claimed in claim 3, wherein an angle of incidence of the incident beam with the surface of the diopter is greater than a refraction limit angle of incidence, to obtain a total internal reflection.

5. The micro-spectrometer as claimed in claim 1, wherein the interference device comprises a set of nanostructures.

6. The micro-spectrometer as claimed in claim 5, further comprising a beam divider disposed in the first medium and configured to divide the incident beam into a first sub-beam and a second sub-beam so they interfere at the surface of the diopter and in which an angle of incidence of the first sub-beam and of the second incident sub-beam with the surface of the diopter is greater than a refraction limit angle of incidence.

7. The micro-spectrometer as claimed in claim 1, further comprising a spatial filtering device disposed in the first medium.

8. The micro-spectrometer as claimed in claim 1, comprising a memory coupled to the calculator and comprising instructions executable by the latter for:
storing a distribution of the signal over the pixels of the sensor;
solving a system of equations [P]=R[ψ] knowing an optical response of the sensor and for a whole set of wavelengths of a mapping; and,
calculating the whole set of the wavelengths of a spectrum.

9. The micro-spectrometer as claimed in claim 8, wherein the computer comprises instructions for solving the system of equations $[P]=R[\psi]$ by a least squares method.

10. The micro-spectrometer as claimed in claim 1, in which each data grid of the mapping is a response of the sensor in gray levels to a given virtually-monochromatic wavelength, an intensity of each incident virtually-monochromatic wavelength of the whole set being known.

* * * * *